(12) United States Patent
Fu et al.

(10) Patent No.: US 11,922,814 B2
(45) Date of Patent: Mar. 5, 2024

(54) METHOD, SYSTEM, AND VEHICLE FOR CONTROLLING A VEHICLE SYSTEM

(71) Applicant: Zenuity AB, Gothenburg (SE)

(72) Inventors: Junsheng Fu, Nödinge (SE); Andreas Schindler, Gothenburg (SE); Mattias Brännström, Gothenburg (SE)

(73) Assignee: Zenuity AB, Gothenburg (SE)

( * ) Notice: Subject to any disclaimer, the term of this patent is extended or adjusted under 35 U.S.C. 154(b) by 260 days.

(21) Appl. No.: 17/069,122

(22) Filed: Oct. 13, 2020

(65) Prior Publication Data

US 2021/0114624 A1 Apr. 22, 2021

(30) Foreign Application Priority Data

Oct. 16, 2019 (EP) ..................................... 19203521

(51) Int. Cl.
*G08G 1/16* (2006.01)
*B60W 50/00* (2006.01)
(Continued)

(52) U.S. Cl.
CPC ......... *G08G 1/166* (2013.01); *B60W 60/0011* (2020.02); *B60W 60/0016* (2020.02); *G06F 18/24* (2023.01); *G06V 20/584* (2022.01); B60W 2050/0075 (2013.01); B60W 2554/4041 (2020.02); B60W 2554/4046 (2020.02); B60W 2556/45 (2020.02)

(58) Field of Classification Search
CPC ......... B60W 60/0016; B60W 60/0011; B60W 2554/4041; B60W 2556/45; B60W 2554/4046; B60W 2050/0075; G06V 20/584; G06K 9/6267
See application file for complete search history.

(56) References Cited

U.S. PATENT DOCUMENTS 10,671,076 B1 * 6/2020 Kobilarov .............. G08G 1/166
2013/0268184 A1 10/2013 Zagorski et al.
(Continued)

OTHER PUBLICATIONS

Extended European Search Report dated Apr. 2, 2020 doe European Patent Application No. 19203521.0, 13 pages.

*Primary Examiner* — Fadey S. Jabr
*Assistant Examiner* — Naeem Taslim Alam
(74) *Attorney, Agent, or Firm* — Sage Patent Group

(57) ABSTRACT

The present disclosure relates to a method to control a vehicle system. The method includes detecting a deviating vehicle having at least one of a deviating behaviour and a deviating vehicle property by means of a perception system of a first vehicle, wherein the perception system includes at least one sensor device configured to monitor a surrounding environment of the first vehicle; assigning a deviating vehicle classification to the deviating vehicle based on the deviating behaviour and/or deviating vehicle property; determining at least one second vehicle to receive information relating to the deviating vehicle; and transmitting to each determined second vehicle a set of information relating to the deviating vehicle, said set of information including at least one of the deviating vehicle classification and a predetermined instruction to be performed by the determined second vehicle, wherein the predetermined instruction is dependent on the deviating vehicle classification.

12 Claims, 5 Drawing Sheets

(51) Int. Cl.
  *B60W 60/00*  (2020.01)
  *G06F 18/24*  (2023.01)
  *G06V 20/58*  (2022.01)

(56) References Cited

U.S. PATENT DOCUMENTS

| | | | |
|---|---|---|---|
| 2015/0178578 A1* | 6/2015 | Hampiholi | G08G 1/166 |
| | | | 348/149 |
| 2015/0241880 A1* | 8/2015 | Kim | G05D 1/0055 |
| | | | 701/25 |
| 2017/0371333 A1* | 12/2017 | Nagy | G05D 1/0291 |
| 2018/0018869 A1 | 1/2018 | Ahmad et al. | |
| 2018/0341277 A1* | 11/2018 | Yang | A63F 13/48 |
| 2019/0051168 A1 | 2/2019 | Du et al. | |
| 2019/0064825 A1* | 2/2019 | Tschanz | G05D 1/0212 |
| 2019/0088135 A1 | 3/2019 | Do et al. | |
| 2020/0077242 A1* | 3/2020 | Shi | H04W 4/48 |
| 2020/0269872 A1* | 8/2020 | Cho | G08G 1/0112 |
| 2021/0020037 A1* | 1/2021 | Awad Alla | G08G 1/017 |

\* cited by examiner

Fig. 4
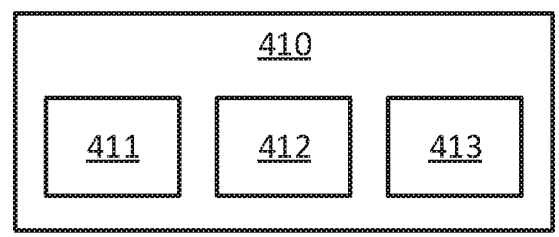
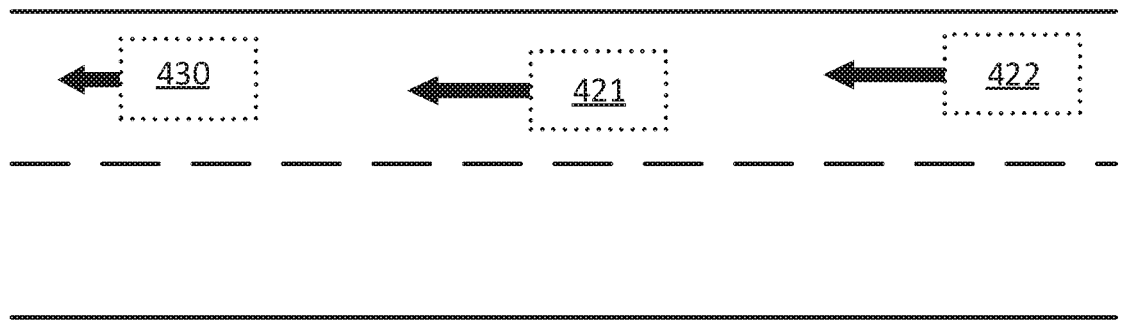

METHOD, SYSTEM, AND VEHICLE FOR CONTROLLING A VEHICLE SYSTEM

CROSS-REFERENCE TO RELATED APPLICATIONS

The present application for patent claims priority to European Patent Office Application Ser. No. 19203521.0, entitled "A METHOD, SYSTEM, AND VEHICLE FOR CONTROLLING A VEHICLE SYSTEM" filed on Oct. 16, 2019, assigned to the assignee hereof, and expressly incorporated herein by reference.

TECHNICAL FIELD OF THE INVENTION

The present disclosure relates to controlling a vehicle system.

BACKGROUND

Autonomous systems (AS) have the ability to act independently of direct human control and in unrehearsed conditions. These systems enables a whole range of applications, such as self-driving cars, humanoid robots and post-delivering drones. However, this increased capability and flexibility comes with a price: The difficulty in assessing reliability and safety of autonomous systems.

Traditional testing methods fall short of providing the desired standard levels, mainly due to the combinatorial explosion of possible situations to be analyzed. There are strict requirements to ensure that AS are safe and reliable. The safety standards enforces the AS to operate without harmful states and the reliability requirement enforces the system to deliver services as specified. These requirements are generally associated with a low threshold of system failures, i.e. high probability of failure-free operation in a specified environment, which in turn require costly and time-consuming validation and verification of the AS.

The development of autonomous driving vehicles is fast and there are regularly news and demonstrations of impressive technological progress. However, one of the largest challenges with AD is not directly concerned with the autonomous vehicle itself but rather the interaction between the autonomous vehicle and human driven vehicles in mixed traffic situations.

In more detail, human drivers are expected to follow traffic rules strictly, however, they also interact with each other in a way which is not captured by traffic rules. This informal traffic behaviour is important since the traffic rules alone may not always be enough to give the safest behaviour. Moreover, human drivers as well as autonomous vehicles need to interact with other road users. The motion of most road users is quite predictable, but may nevertheless in some cases deviate significantly e.g. by driving excessively fast, unexpectedly slow, drive with large lateral deviations or act aggressively. Driving safely and comfortably can be challenging when interacting with such road users.

Thus, there is a need in the art for new and improved solutions for autonomous vehicles with features that compensate for otherwise typically "human" behaviour that is missing in conventional autonomous drive (AD) solutions, so to increase the road safety in various traffic situations in co-existence with human driven vehicles.

SUMMARY OF THE INVENTION

One object of the present disclosure is to at least mitigate the above problem.

This has in accordance with the present disclosure been achieved by means of a method to control a vehicle system, the method comprising: detecting a deviating vehicle having at least one of a deviating behaviour and a deviating vehicle property by means of a perception system of a first vehicle, wherein the perception system comprises at least one sensor device configured to monitor a surrounding environment of the first vehicle; assigning a deviating vehicle classification to the deviating vehicle based on the deviating behaviour and/or deviating vehicle property; determining at least one second vehicle to receive information relating to the deviating vehicle; transmitting to each determined second vehicle a set of information relating to the deviating vehicle, said set of information comprising at least one of the deviating vehicle classification and a predetermined instruction to be performed by the determined second vehicle, wherein the predetermined instruction is dependent on the deviating vehicle classification; receiving at each determined second vehicle the set of information; and controlling a vehicle system at each determined second vehicle so as to perform a predetermined action based on the deviating vehicle classification or based on the predetermined instruction.

This has the advantage of allowing at least one second vehicle to be notified of a probable encounter with a deviating vehicle. A further advantage is allowing the second vehicle to receive information relating to the type of deviating vehicle, the deviating vehicle classification. Thereby, the driver and/or advanced driver assistance system and/or an automated driving system is allowed to prepare for the probable upcoming traffic situation.

Thereby, uncomfortable driving can be reduced. Entering a traffic situation with a prepared driver or driving system may decrease the risk of accidents.

The term "advanced driver assistance system" refers to a vehicle system arranged to provide levels of automation according to SAE level 1 or level 2.

The term "automated driving system" refers to a vehicle system arranged to provide levels of automation according to SAE level 3, level 4 or level 5.

The step of detecting a deviating vehicle may comprise determining a timestamped location relating to the deviating vehicle, and determining at least one second vehicle is further based on the determined timestamped location.

This has the advantage of allowing the detected deviating behaviour and/or a deviating vehicle property to be associated with a geographical location and a point in time. This may further allow the step of determining at least one second vehicle to obtain information relating to the deviating vehicle to utilize the determined geographical location and point in time to improve the probability of the determined at least one second vehicle to encounter said deviating vehicle.

The step of assigning a deviating vehicle classification to the deviating vehicle may be performed at the first vehicle.

The step of assigning a deviating vehicle classification to the deviating vehicle may be performed at a server.

The step of assigning a deviating vehicle classification to the deviating vehicle may be based on the deviating behaviour and/or deviating vehicle property and at least one predetermined criteria associated with a classification.

The step of assigning a deviating vehicle classification to the deviating vehicle based on the deviating behaviour and/or deviating vehicle property may utilize at least one machine learning algorithm.

The step of determining at least one second vehicle may comprise determining for each second vehicle a time interval; the set of information transmitted to each second vehicle may comprise the time interval; and a vehicle system at each second vehicle may be controlled to perform the predetermined action during at least part of the time interval comprised in the set of information transmitted to that second vehicle.

The time interval may be one point in time.

The step of determining at least one second vehicle may be based on a predicted path of the deviating vehicle.

The step of determining at least one vehicle to receive information may be performed at the first vehicle.

The step of determining at least one vehicle to receive information may be performed at the server.

The step of transmitting to each second vehicle a set of information, wherein at least one set of information may comprise an expected path of the deviating vehicle. The expected path of the deviating vehicle may comprise at least one point along the path with an estimated time relating to the expected time of the deviating vehicle arriving at said point.

The step of transmitting to each second vehicle a set of information, wherein at least one set of information comprises a time interval, wherein said time interval may be determined based on the path relating to the deviating vehicle and the predicted path of the second vehicle.

This has the advantage of allowing at least one vehicle system at a second vehicle to better predict the potential traffic situation. This has further the advantage of better allowing the predetermined action to be performed at an appropriate point in time and/or duration of time.

At least one predetermined instruction to be performed by the determined second vehicle based on the deviating vehicle classification may comprise a manoeuvre instruction to an advanced driver assistance system and/or an automated driving system.

The manoeuvre instruction may be an instruction to be in a specific lane, drive defensively and/or keep extra distance to vehicles ahead.

The step of controlling a vehicle system at each second vehicle to perform the predetermined action may comprise at least at one second vehicle presenting information determined based on the deviating vehicle classification or based on the predetermined instruction.

Presenting information may comprise notifying the driver via presentation means to avoid takeover or keep extra distance to vehicles ahead. Presenting information may comprise visual, acoustic and/or haptic notifications for the driver.

The step of controlling a vehicle system at each second vehicle to perform the predetermined action may comprise at least at one second vehicle adjusting a parameter of an advanced driver assistance system and/or an automated driving system based on the deviating vehicle classification or based on the predetermined instruction.

This has the advantage of allowing an advanced driver assistance system and/or an automated driving system to better prepare for a probable traffic situation. In one example the method may control the automated driving system of a second vehicle to not overtake for a period of time upon receiving a set of information relating to a deviating vehicle classified as fast vehicle.

The step of controlling a vehicle system at each second vehicle to perform the predetermined action may comprise adjusting the parameter at at least one second vehicle for the duration of the time interval.

This has the advantage of allowing the predetermined action to be performed at the at least one second vehicle at a specific time or during a desired time interval.

At least one set of information may comprise manoeuvre instructions to an advanced driver assistance system and/or an automated driving system, instructions such as avoid takeover or change to a slow lane.

The step of assigning the deviating vehicle classification may be based on at least one detected deviating behaviour and/or a deviating vehicle property from at least two first vehicles detecting the deviating vehicle.

This has the advantage of allowing the deviating vehicle classification to be assigned based on information from multiple sources, thereby reducing at least some risks of incorrectly assigning a deviating vehicle classification. This has the further advantage of allowing at least one second vehicle to be determined based on information from multiple sources, thereby allowing for an increased probability of each second vehicle to encounter the deviating vehicle.

The step of determining at least one second vehicle may be based on a predicted path of the deviating vehicle. The predicted path of the deviating vehicle may be determined based on the deviating vehicle classification of said deviating vehicle.

The predicted path may be based on a detected speed of the deviating vehicle.

The step of assigning the deviating vehicle classification may comprise selecting the deviating vehicle classification from a set of deviating vehicle classification types comprising slow vehicle, and/or fast vehicle, and/or erratic vehicle, and/or wide vehicle.

In one example the method may assign the slow vehicle deviating vehicle classification to a detected deviating vehicle with a speed fulfilling at least one slow vehicle criteria. The method may further assign the fast vehicle deviating vehicle classification to a detected deviating vehicle with a speed fulfilling at least one fast vehicle criteria. The method may further assign the erratic deviating vehicle classification to a detected deviating vehicle with change in speed and/or change in lateral position fulfilling at least one erratic vehicle criteria. The method may further assign the wide vehicle deviating vehicle classification to a detected deviating vehicle with a vehicle width fulfilling at least one wide vehicle criteria.

The predetermined action types may comprise avoid changing lanes, prepare to overtake, avoid overtaking, keep extra distance to vehicles ahead, change to slow lane, and decrease speed.

At least one predetermined action type may be performed upon obtaining a set of information relating to a deviating vehicle assigned at least one predetermined deviating vehicle classification.

The present disclosure further relates to a system to control a vehicle system, the system comprises a server comprising communication means, a processor and a memory storage, the system further comprises at least one first vehicle comprising a perception system and communication means, and at least one second vehicle comprising communication means.

The perception system comprises at least one sensor device configured to monitor a surrounding environment of the first vehicle. The at least one first vehicle is arranged to detect a deviating vehicle having at least one of a deviating behaviour a deviating vehicle property using the perception system, and transmit via the transmission means information relating to the deviating vehicle to the server. The server is arranged to determine at least one of said at least one second vehicle to receive information relating to the deviating vehicle; and transmit to each determined second vehicle a set of information relating to the deviating vehicle. The set of information comprising at least one of the deviating vehicle classification and a predetermined instruction to be performed by the determined seconded vehicle, wherein the predetermined instruction is dependent on the deviating vehicle classification. The system is arranged classify the deviating vehicle based on the detected deviating behaviour and/or deviating vehicle property. The at least one second vehicle is arranged to receive the set of information via communication means. The at least one second vehicle comprises at least one of: presentation means arranged to present information based on the deviating vehicle classification or based on the predetermined instruction, an advanced driver-assistance system configured to adjust a parameter based on the deviating vehicle classification or based on the predetermined instruction, and an autonomous driving system configured to adjust a parameter based on the deviating vehicle classification or based on the predetermined instruction.

This has the advantage of allowing a first vehicle to detect a deviating vehicle and at least one of the at least one second vehicle to receive a set of information relating to the detected deviating vehicle. A further advantage is allowing at least one vehicle system at each second vehicle upon receiving information relating to the detected deviating vehicle to perform a predetermined action based on the classification of the deviating vehicle.

The server may be arranged to determine at least one of the at least one second vehicle based on a second vehicle's proximity to the deviating vehicle.

The first vehicle may comprise positioning means, wherein the positioning means are arranged to determine the geographical location of the first vehicle and the time.

The perception system may comprise the positioning means arranged to determine the geographical location of the first vehicle and the time.

This has the advantage of allowing the first vehicle to associate the detected deviating behaviour and/or deviating vehicle property with a geographical location and a point in time.

The at least one first vehicle may be arranged to transmit via the transmission means to the server information relating to the deviating vehicle.

The server may be arranged to classify the deviating vehicle based on at least one received information relating to the deviating vehicle.

The first vehicle may be arranged to classify the deviating vehicle based on the detected deviating behaviour and/or deviating vehicle property.

The first vehicle may be arranged to transmit the assigned deviating vehicle classification to the server.

This has the advantage of allowing the first vehicle to utilize an amount of data to assign a classification and transmit a significantly smaller amount of data to the server. This may further allow a first vehicle to classify a detected deviating vehicle and in the case of the server being unavailable transmit information relating to the deviating vehicle directly to at least one second vehicle.

The present disclosure further relates to a vehicle comprising communication means arranged to receive a set of information relating to a deviating vehicle, said set of information comprising at least one of the deviating vehicle classification and a predetermined instruction to be performed by the vehicle, wherein the predetermined instruction is dependent on the deviating vehicle classification. The vehicle further comprises at least one of:

presentation means arranged to present information based on the deviating vehicle classification or based on the predetermined instruction, an advanced driver-assistance system configured to adjust a parameter based on the deviating vehicle classification or based on the predetermined instruction, and an autonomous driving system configured to adjust a parameter based on the deviating vehicle classification or based on the predetermined instruction.

This has the advantage of allowing the vehicle to receive a set of information relating to a deviating vehicle. This has the further advantage of at least one of the vehicle's system performing a predetermined action, wherein the predetermined action is based on the deviating vehicle classification or based on the predetermined instruction.

Presenting information by presentation means may comprise notifying the driver via presentation means to avoid takeover or keep extra distance to vehicles ahead. Presenting information may comprise visual, acoustic and/or haptic notifications for the driver.

The vehicle may further comprise a perception system, wherein the perception system comprising at least one sensor device configured to monitor a surrounding environment of the vehicle. The perception system is arranged to detect a deviating vehicle having a deviating behaviour and/or deviating vehicle property. The communication means are arrange to transmit information relating to the detected deviating vehicle.

The vehicle may further comprise a perception system and positioning means, wherein the perception system comprising at least one sensor device configured to monitor a surrounding environment of the vehicle. The perception system is arranged to detect a deviating vehicle having a deviating behaviour and/or deviating vehicle property. The positioning means are arrange to determine the geographical location of the vehicle. The communication means are arrange to transmit information relating to the detected deviating vehicle.

This has the advantage of allowing the vehicle to transmit geographically associated deviating behaviour and/or deviating vehicle property to potentially reduce uncomfortable driving for other vehicles.

The vehicle may be arranged to assign a deviating vehicle classification to a detected deviating vehicle and transmit said deviating vehicle classification.

The present disclosure further relates to a server comprising communication means, a processor and a memory storage. The communication means are arranged to receive information relating to a deviating vehicle from at least one first vehicle. The server is arranged to determine at least one second vehicle to receive information relating to the deviating vehicle. The communication means are further arranged to transmit to each determined second vehicle a set of information relating to the deviating vehicle. The set of information comprising at least one of a deviating vehicle classification assigned to the deviating vehicle and a predetermined instruction to be performed by the determined seconded vehicle, wherein the predetermined instruction is dependent on the deviating vehicle classification.

The communication means may be arranged to receive detected deviating behaviour and/or deviating vehicle property from at least one first vehicle.

The server may be arranged classify the deviating vehicle based on the detected deviating behaviour and/or deviating vehicle property.

The communication means may be arranged to receive the deviating vehicle classification assigned to the deviating vehicle from the at least one first vehicle.

The present disclosure further relates to a computer program product comprising a non-transitory computer-readable storage medium having thereon a computer program comprising program instructions, the computer program being loadable into a data processing unit and configured to cause the processing unit to perform the method according to any one of the preceding claims.

The computer program product may be comprised in the server. The computer program product may be comprised in the first vehicle.

In one example the computer program product comprises a non transitory computer-readable storage medium having thereon a computer program comprising program instructions, the computer program being loadable into a data processing unit and configured to cause the processing unit to carry out a method to control a vehicle system, the method comprising: detecting a deviating vehicle having at least one of a deviating behaviour and a deviating vehicle property by means of a perception system of a first vehicle, wherein the perception system comprises at least one sensor device configured to monitor a surrounding environment of the first vehicle; assigning a deviating vehicle classification to the deviating vehicle based on the deviating behaviour and/or deviating vehicle property; determining at least one second vehicle to receive information relating to the deviating vehicle; transmitting to each determined second vehicle a set of information relating to the deviating vehicle, said set of information comprising at least one of the deviating vehicle classification and a predetermined instruction to be performed by the determined second vehicle, wherein the predetermined instruction is dependent on the deviating vehicle classification; receiving at each determined second vehicle the set of information; and controlling a vehicle system at each determined second vehicle so as to perform a predetermined action based on the deviating vehicle classification or based on the predetermined instruction.

BRIEF DESCRIPTION OF FIGURES

Further objects, features and advantages of embodiments of the disclosure will appear from the following detailed description, reference being made to the accompanying drawings, in which:

FIG. 4 depicts schematically a server.

DETAILED DESCRIPTION

Figure 1:
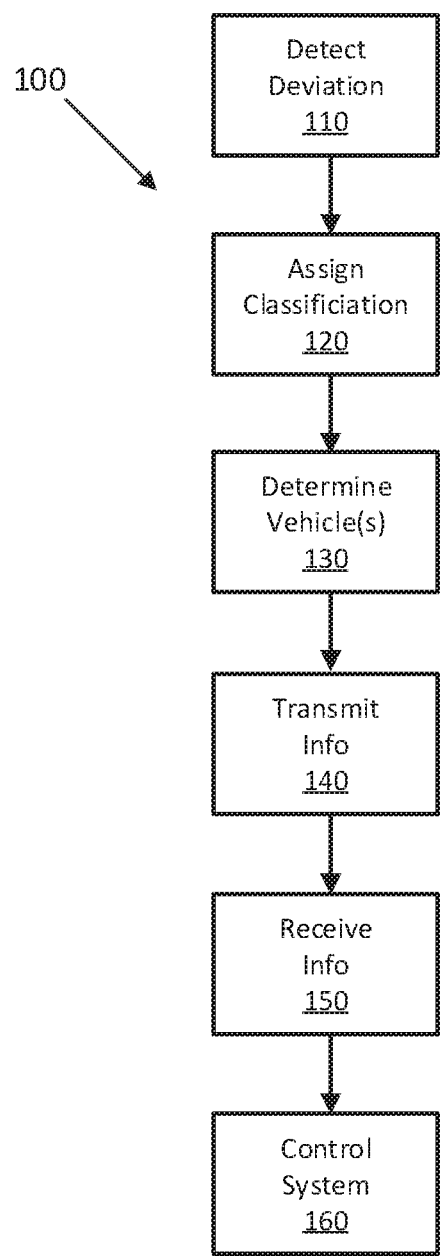
FIG. 1 shows schematically a method to control a vehicle system.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Throughout the figures, same reference numerals refer to same parts, concepts, and/or elements. Consequently, what will be said regarding a reference numeral in one figure applies equally well to the same reference numeral in other figures unless not explicitly stated otherwise.

FIG. 1 shows schematically a method to control a vehicle system. The method comprises the steps of detecting 110 a deviating vehicle having at least one of a deviating behaviour and/or a deviating vehicle property, assigning 120 a deviating vehicle classification to the deviating vehicle based on the deviating behaviour and/or deviating vehicle property, determining 130 at least one second vehicle to receive information relating to the deviating vehicle, transmitting 140 to each second vehicle a set of information relating to the deviating vehicle, receiving 150 at each second vehicle the set of information, and controlling 160 a vehicle system at each second vehicle to perform the predetermined action based on the received set of information.

The step of detecting 110 the deviating vehicle may utilize a perception system of a first vehicle, wherein the perception system comprises at least one sensor device configured to monitor a surrounding environment of the first vehicle.

The step of detecting 110 a deviating vehicle may comprise determining a timestamped location relating to the deviating vehicle.

The timestamped location has the advantage of allowing the deviating behaviour and/or deviating vehicle property to be linked to a time and place, thereby improving the ability to determine 130 at least one vehicle to receive information relating to the deviating vehicle.

The step of assigning 120 a deviating vehicle classification to the deviating vehicle may be based on the deviating behaviour and/or deviating vehicle property and a predetermined norm for driving behaviour and vehicle properties.

The step of assigning 120 a deviating vehicle classification to the deviating vehicle may be based on the deviating behaviour and/or deviating vehicle property and at least one predetermined criteria associated with a classification.

The step of assigning 120 a deviating vehicle classification to the deviating vehicle based on the deviating behaviour and/or deviating vehicle property may utilize at least one machine learning algorithm.

The step of assigning 120 a deviating vehicle classification to the deviating vehicle may be performed at the first vehicle.

The step of assigning 120 a deviating vehicle classification to the deviating vehicle may be performed at a server.

The step of assigning 120 a deviating vehicle classification to the deviating vehicle may comprise transmitting from the first vehicle information comprising the assigned deviating vehicle classification, and receiving at the server said information comprising the assigned deviating vehicle classification. The vehicle information comprising the assigned deviating vehicle classification may comprise a timestamped location.

The step of assigning 120 a deviating vehicle classification to the deviating vehicle may comprise transmitting from the first vehicle information relating to the detected deviating behaviour and/or deviating vehicle property, and receiving at the server said information relating to the detected deviating behaviour and/or deviating vehicle property. The information relating to the detected deviating behaviour and/or deviating vehicle property may comprise a timestamped location.

The step of assigning 120 the deviating vehicle classification may be based on at least one detected deviating behaviour or a deviating vehicle property from at least two first vehicles detecting 110 the deviating behaviour and/or deviating vehicle property of the deviating vehicle.

This has the advantage of allowing the deviating vehicle classification to be assigned 120 based on information from multiple sources, thereby reducing at least some risks of incorrectly assigning 120 a deviating vehicle classification. This has the further advantage of allowing at least one second vehicle to be determined 130 based on information from multiple sources, thereby allowing for an increased probability of each second vehicle to encounter the deviating vehicle.

The deviating vehicle classification types may comprise slow vehicle, fast vehicle, erratic vehicle, and/or wide vehicle. The slow vehicle classification relates to a vehicle moving along the road at a speed significantly slower than the speed limit and/or the speed of other vehicles. The fast vehicle classification relates to a vehicle moving along the road at a speed significantly higher than the speed limit and/or the speed of other vehicles. The erratic vehicle classification relates to a vehicle varying speed and/or sideways position in an unpredictable manner. The wide vehicle classification relates to a vehicle wider than one lane of the road.

The step of determining 130 at least one second vehicle may be based on the deviating vehicle classification.

The step of determining 130 at least one second vehicle may be arranged to utilizing a set of deviating vehicle classification types comprising slow vehicle, fast vehicle, and/or erratic vehicle. The slow vehicle classification relates to a vehicle moving along the road at a speed significantly slower than the speed limit and/or the speed of other vehicles, therefor any second vehicles behind the slow deviating vehicle may be likely to experience a traffic situation with the slow deviating vehicle. The fast vehicle classification relates to a vehicle moving along the road at a speed significantly higher than the speed limit and/or the speed of other vehicles, therefor any second vehicles ahead of the fast deviating vehicle may be likely to experience a traffic situation with the fast deviating vehicle. The erratic vehicle classification relates to a vehicle varying speed and/or sideways position in an unpredictable manner, therefore any second vehicles in a proximity of the erratic deviating vehicle may be likely to experience a traffic situation with the fast deviating vehicle.

The step of determining 130 at least one second vehicle may be based on the determined timestamped location.

The step of determining 130 at least one second vehicle may comprise determining for each second vehicle a time interval the set of information transmitted 140 to each second vehicle may comprise the time interval; and a vehicle system at each second vehicle may be controlled 160 to perform the predetermined action during at least part of the time interval comprised in the set of information transmitted to that second vehicle.

The step of determining 130 at least one second vehicle may be based on a predicted path of the deviating vehicle.

The step of determining 130 at least one vehicle to receive information may be performed at the first vehicle.

The step of determining 130 at least one vehicle to receive information may be performed at the server.

The step of transmitting 140 to each second vehicle a set of information, said set of information comprising at least one of the deviating vehicle classification and a predetermined instruction to be performed by the determined second vehicle, wherein the predetermined instruction is dependent on the deviating vehicle classification.

The predetermined instruction may comprise a specific predetermined instruction for the deviating vehicle classification.

Each set of information transmitted 140 to a second vehicle may be individually tailored for each second vehicle.

At least one predetermined action determined based on the deviating vehicle classification or predetermined instruction may comprise a manoeuvre instruction to an advanced driver assistance system and/or an automated driving system.

The term "advanced driver assistance system" refers to a vehicle system arranged to provide levels of automation according to SAE level 1 or level 2.

The term "automated driving system" refers to a vehicle system arranged to provide levels of automation according to SAE level 3, level 4 or level 5.

The step of transmitting 140 to each second vehicle a set of information, wherein at least one set of information may comprise the timestamped location relating to time and location of detecting 110 the deviating vehicle.

The step of transmitting 140 to each second vehicle a set of information, wherein at least one set of information may comprise a time interval. The time interval may comprise at least one time associated with an estimated time the second vehicle and the deviating vehicle are predicted to coexist in a traffic situation.

The step of transmitting 140 to each second vehicle a set of information, wherein at least one set of information may comprise an expected path of the deviating vehicle. The expected path of the deviating vehicle may comprise at least one point along the path with an estimated time relating to the expected time of the deviating vehicle arriving at said point.

The step of transmitting 140 to each second vehicle a set of information, wherein at least one set of information comprises a time interval, wherein said time interval may be determined based on the path relating to the deviating vehicle and the predicted path of the second vehicle.

The step of transmitting 140 to each least second one vehicle a set of information may be performed at the first vehicle.

The step of transmitting 140 to each least one second vehicle a set of information may be performed at a server.

The step of receiving 150 at each second vehicle the set of information may comprise at least at one second vehicle storing at least part of said received set of information in a memory storage comprised in said second vehicle.

The step of receiving 150 at each second vehicle the set of information may comprise at least one second vehicle determining the predetermined action based on the deviating vehicle classification.

The step of receiving 150 at each second vehicle the set of information may comprise at least one second vehicle determining the predetermined action based on the deviating vehicle classification and/or the predetermined instruction.

The step of controlling 160 a vehicle system at each second vehicle to perform the predetermined action may at least at one second vehicle be based on the deviating vehicle classification and/or the predetermined instruction determined based on the deviating vehicle classification.

The predetermined action may be a predetermined action for the deviating vehicle classification.

The step of controlling 160 a vehicle system at each second vehicle to perform the predetermined action may at least at one second vehicle be performed during at least part of the received time interval.

The step of controlling 160 a vehicle system at each second vehicle to perform the predetermined action, wherein at least on of said predetermined action based on the deviating vehicle classification and/or the predetermined instruction may comprise presenting information determined based on the deviating vehicle classification.

Presenting information may comprise notifying the driver via presentation means to avoid takeover or keep extra distance to vehicles ahead. Presenting information may comprise visual, acoustic and/or haptic notifications for the driver.

The step of controlling 160 a vehicle system at each second vehicle to perform the predetermined action, wherein at least on of said predetermined action based on the deviating vehicle classification and/or the predetermined instruction may comprise adjusting a parameter of an advanced driver assistance system and/or an automated driving system based on the deviating vehicle classification or the predetermined instruction.

The step of controlling 160 a vehicle system at each second vehicle to perform the predetermined action, wherein at least on of said predetermined action based on the deviating vehicle classification and/or the predetermined instruction may comprise adjusting the parameter of the advanced driver assistance system and/or the automated driving system during the duration of the time interval.

The predetermined action based on the deviating vehicle classification and/or the predetermined instruction may comprise presenting a notification to change to a slower lane and/or avoid overtaking.

The predetermined action based on the deviating vehicle classification and/or the predetermined instruction may comprise adjusting an advanced driver assistance system to be more prone to presenting a notification to change to a slower lane and/or avoid overtaking.

The predetermined action based on the deviating vehicle classification and/or the predetermined instruction may comprise adjusting an automated driving system to change to a slower lane and/or avoid overtaking.

The predetermined action types may comprise avoid changing lanes, prepare to overtake, avoid overtaking, keep extra distance, change to slow lane, and decrease speed.

Figure 2:
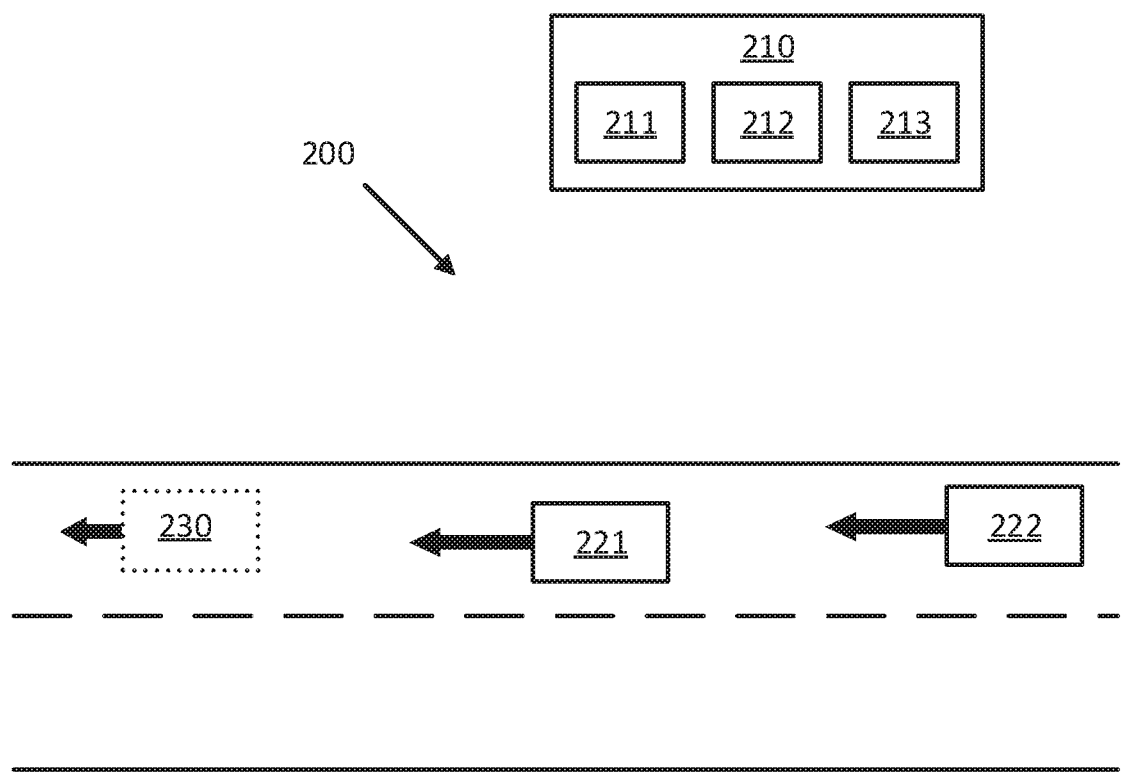
FIG. 2 depicts schematically a system to control a vehicle system.

FIG. 2 depicts schematically a system to control a vehicle system to reduce uncomfortable driving. The system 200 comprises a server 210 comprising communication means 211, a processor 212 and a memory storage 213. The system 200 further comprises a first vehicle 221 comprising a perception system and communication means. The system 200 further comprises at least one second vehicle 222 comprising communication means. The perception system comprising at least one sensor device configured to monitor a surrounding environment of the first vehicle 221. The first vehicle 221 is arranged to detect a deviating vehicle 230 having a deviating behaviour and/or a deviating vehicle property using the perception system; and transmit via the communication means information relating to the deviating vehicle 230 to the server 210. The server 210 is arranged to determine at least one of said at least one second vehicle 222 to receive information relating to the deviating vehicle 230; and transmit to each determined second vehicle 222 a set of information relating to the deviating vehicle 230. The system 200 is arranged classify the deviating vehicle 230 based on the detected deviating behaviour and/or deviating vehicle property. The at least one second vehicle 222 is arranged to receive the set of information via said communication means. The at least one second vehicle 222 comprises at least one of: presentation means arranged to present information relating to the received set of information, an autonomous driving system configured to adjust a parameter based on the received set of information, and an advanced driver-assistance system configured to adjust a parameter based on the received set of information.

The first vehicle 221 may comprise a perception system, wherein the perception system comprises a LiDAR device and/or a GPS device.

The first vehicle 221 may be arranged to determine a timestamped location relating to the deviating vehicle 230, and transmit to the server 210 via the transmission means information relating to the deviating vehicle 230 comprising the determined timestamped location.

The server 210 may be arranged to receive information relating to the deviating vehicle 230 from the first vehicle 221 via said communication means 211.

The server 210 may be arranged to determine at least one of said at least one second vehicle 222, wherein determining is based on the classification of the deviating vehicle 230.

The server 210 may be arranged to determine at least one of said at least one second vehicle 222 based on vehicle's proximity to the deviating vehicle 230.

The server 210 may be arranged to determine at least one of said at least one second vehicle 222 to receive information relating to the deviating vehicle 230 based on the determined timestamped location.

The server 210 may be arranged to for at least one determined second vehicle 222 determine a time interval, and transmit to said determined second vehicle 222 the set of information relating to the deviating vehicle 230, wherein said set of information comprises the time interval.

The server 210 may be arranged to transmit to each determined second vehicle 222 a set of information, wherein at least one of said set of information comprises comprising at least one of the deviating vehicle classification and a predetermined instruction to be performed by the determined second vehicle.

The server 210 may be arranged to transmit to each determined second vehicle 222 a set of information, wherein said set of information comprises comprising at least one of the deviating vehicle classification and the predetermined instruction to be performed by the determined second vehicle.

The at least one second vehicle 222 may comprise at least one of: presentation means arranged to present information relating to the predetermined instruction to be performed by the determined second vehicle, an autonomous driving system configured to adjust a parameter based on the predetermined instruction to be performed by the determined second vehicle, and an advanced driver-assistance system configured to adjust a parameter based on the predetermined instruction to be performed by the determined second vehicle.

The system 200 may comprise at least two first vehicles 221.

The system 200 may be arranged to classify the deviating vehicle 230 based on the detected deviating behaviour and/or deviating vehicle property from a deviating vehicle 230 from at least two first vehicles 221.

The classification may relate to a set of driving behaviours associated with aggressive driving or erratic driving.

The system 200 may be arranged to classify the deviating vehicle 230 based on the detected deviating behaviour and/or deviating vehicle property, and a predetermined norm for driving behaviour and vehicle properties.

The system 200 may be arranged to classify the deviating vehicle 230 based on the detected deviating behaviour and/or deviating vehicle property matching at least one predetermined criteria associated with a deviating vehicle classification type.

The server 210 may be arranged to classify the deviating vehicle 230 based on the detected deviating behaviour and/or deviating vehicle property.

The first vehicle 221 may be arranged to classify the deviating vehicle 230 based on the detected deviating behaviour and/or deviating vehicle property.

The system may be arranged to classify a detected deviating vehicle 230 selecting the deviating vehicle classification from a set of deviating vehicle classification types comprising slow vehicle and/or fast vehicle and/or erratic vehicle, and/or wide vehicle.

In an example system 200 the slow vehicle classification relates to a vehicle moving along the road at a speed at least 30 km/h below the speed limit and/or the average speed of traffic. In an example system 200 the fast vehicle classification relates to a vehicle moving along the road at a speed at least 30 km/h above the speed limit and/or the average speed of traffic. The erratic vehicle classification relates to a vehicle varying speed and/or sideways position in an unpredictable manner, such as frequent lane changes without turn signal indications. The wide vehicle classification relates to a vehicle wider than one lane of the road.

The at least one second vehicle 222 may be arranged to upon receiving the set of information relating to the deviating vehicle 230 determine the predetermined action based on at least one of the deviating vehicle classification and the predetermined instruction to be performed by the determined second vehicle.

The at least one second vehicle 222 may be arranged to upon receiving the set of information relating to the deviating vehicle 230 perform a predetermined action based on at least one of the deviating vehicle classification and the predetermined instruction to be performed by the determined second vehicle by means of presentation means presenting information based on to the deviating vehicle classification and/or the predetermined instruction.

Presenting information at the second vehicle 222 may comprise notifying the driver via presentation means to avoid takeover or keep extra distance to vehicles ahead. Presenting information may comprise visual, acoustic and/or haptic notifications for the driver.

The at least one second vehicle 222 may be arranged to upon receiving the set of information relating to the deviating vehicle 230 comprising a time interval perform a predetermined action during at least part of the received time interval.

The at least one second vehicle 222 may be arranged to upon receiving the set of information relating to the deviating vehicle 230 comprising a time interval perform a predetermined action based on at least one of the deviating vehicle classification and the predetermined instruction comprises adjusting a parameter of an advanced driver assistance system and/or an automated driving system based on to the deviating vehicle classification.

The at least one second vehicle 222 may be arranged to perform a predetermined action based on at least one of the deviating vehicle classification and the predetermined instruction, wherein the predetermined action comprises adjusting the parameter for the duration of the time interval.

The predetermined action types may comprise avoid changing lanes, prepare to overtake, avoid overtaking, keep extra distance, change to slow lane, and decrease speed.

At least one specific predetermined action type may be performed upon obtaining a set of information relating to a deviating vehicle 230, assigned at least one specific predetermined deviating vehicle classification. In one example system 200 the second vehicle 222 upon obtaining a set of information relating to a slow deviating vehicle 230 at least performs the predetermined action to present a slow vehicle warning.

The server 210 may be comprised in a vehicle. The first vehicle 221 may comprise the server 210.

Figure 3:
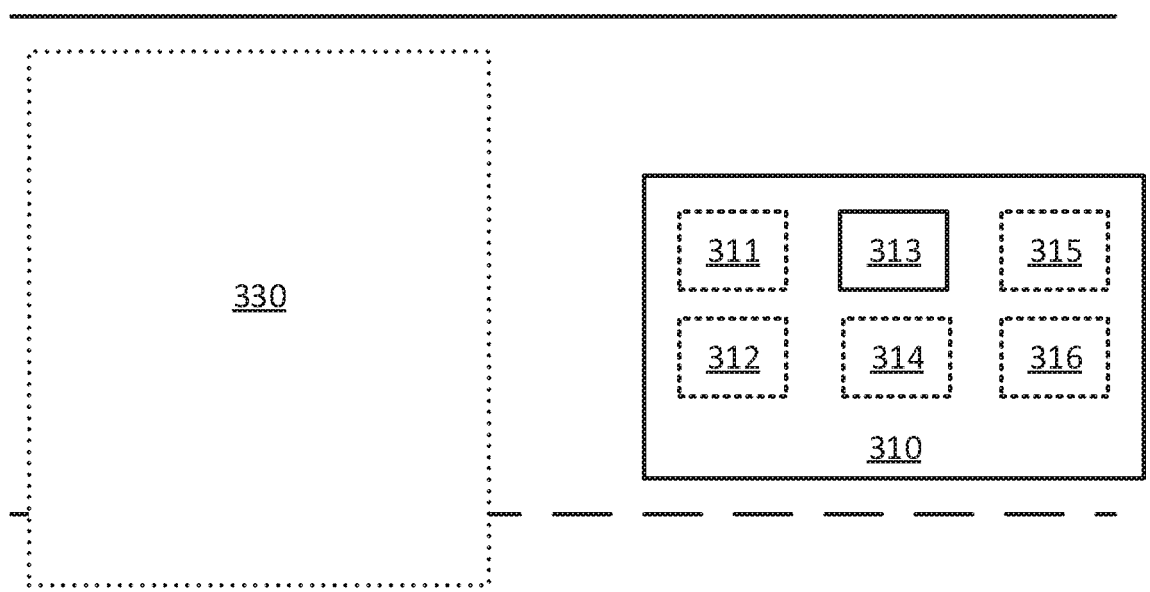
FIG. 3 depicts schematically a vehicle.

FIG. 3 depicts schematically an example vehicle 310 comprises communication means 313, the vehicle 310 further comprises presentation means 314, and advanced driver assistance systems 315 and/or autonomous driving systems 316. The communication means 313 are arrange to receive a set of information relating to a deviating vehicle 330. The presentation means 314 are arrange to present information relating to the received set of information, and the advanced driver assistance systems 315 and/or the autonomous driving systems 316 are configured to adjust a parameter based on the received set of information.

The communication means 313 may be arrange to receive a set of information relating to a deviating vehicle 330, wherein said set of information said set of information comprising at least one of the deviating vehicle classification and a predetermined instruction to be performed by the determined second vehicle, wherein the predetermined instruction is dependent on the deviating vehicle classification.

The presentation means 314 are arranged to present information relating to the deviating vehicle classification and the predetermined instruction.

The advanced driver assistance systems 315 and/or the autonomous driving systems 316 are configured to adjust a parameter based on deviating vehicle classification and the predetermined instruction.

The vehicle 310 may comprise a perception system 311 arranged to detect a deviating vehicle 330 having a deviating behaviour and/or deviating vehicle property, wherein the perception system 311 comprises at least one sensor device configured to monitor a surrounding environment of the vehicle 310.

The vehicle 310 may comprise positioning means 312 arranged to determine the position of the vehicle 310.

The communication means 313 may be arranged to transmit information relating to the detected deviating behaviour and/or deviating vehicle property of the deviating vehicle 330.

The vehicle 310 comprising a perception system 311 may be arranged to classify the deviating vehicle 230 based on the detected deviating behaviour and/or deviating vehicle property, and transmit via the communication means 313 said classification.

The vehicle 310 may be arranged to classify a detected deviating vehicle 330 utilizing a set of deviating vehicle classification types comprising slow vehicle, fast vehicle, erratic vehicle, and/or wide vehicle. The slow vehicle classification relates to a vehicle moving along the road at a speed significantly slower than the speed limit and/or the speed of other vehicles. The fast vehicle classification relates to a vehicle moving along the road at a speed significantly higher than the speed limit and/or the speed of other vehicles. The erratic vehicle classification relates to a vehicle varying speed and/or sideways position in an unpredictable manner. The wide vehicle classification relates to a vehicle wider than one lane of the road.

The vehicle 310 comprising a perception system 311 and positioning means 312 may be arranged to determine a timestamped location relating to the detected deviating behaviour and/or deviating vehicle property of the deviating vehicle 330.

The vehicle 310 may upon receiving a set of information comprising a time interval be arranged to present information via presentation means 314 and/or adjust a parameter of an advanced driver-assistance system 315 and/or an autonomous driving system 316 during at least part of the received time interval.

Presenting information at the second vehicle 222 may comprise notifying the driver via presentation means to avoid takeover or keep extra distance to vehicles ahead. Presenting information may comprise visual, acoustic and/or haptic notifications for the driver.

The vehicle 310 may upon receiving a set of information comprising a time interval be arranged to adjust a parameter of an advanced driver-assistance system 315 and/or an autonomous driving system 316 for the duration of the time interval.

FIG. 4 depicts schematically an example server 410 comprising communication means 411, a processor 412 and a memory storage 413. The communication means 411 are arranged to receive information relating to a deviating vehicle 430 from at least one first vehicle 421. The server 410 is arranged to determine at least one second vehicle 422 to receive information relating to the deviating vehicle 430. The communication means 411 are further arranged to transmit to each determined second vehicle 422 a set of information relating to the deviating vehicle 430. The set of information comprising at least one of a deviating vehicle classification assigned to the deviating vehicle 430 and a predetermined instruction to be performed by the determined seconded vehicle, wherein the predetermined instruction is dependent on the deviating vehicle classification.

The communication means 411 may be arranged to receive detected deviating behaviour and/or deviating vehicle property from at least one first vehicle.

The server 410 may be arranged classify the deviating vehicle 430 based on the detected behaviour and/or deviating vehicle property.

The processor 412 may be arranged to control the communication means 411.

The memory storage 413 may comprise computer instructions, wherein said computer instructions when executed on the processor 412 determines the at least one second vehicle 422 to receive information and the set of information to be transmitted to each determined second vehicle 422.

Figure 5:
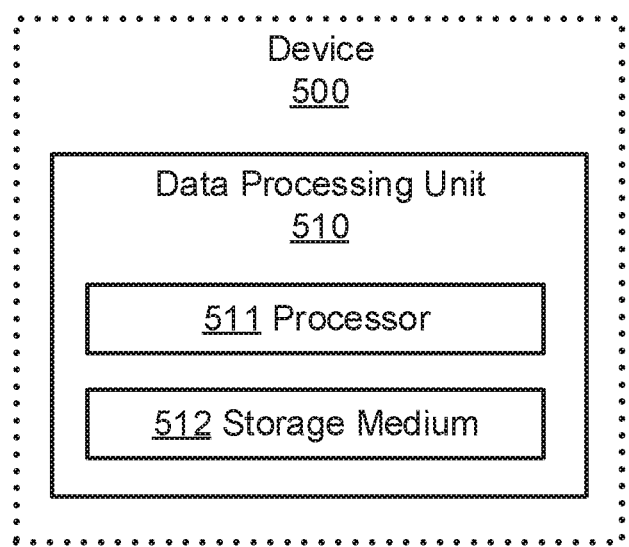
FIG. 5 depicts schematically a computer program product.

FIG. 5 depicts a computer program product comprising a non-transitory computer-readable storage medium 512. The non-transitory computer-readable storage medium 512 having thereon a computer program comprising program instructions. The computer program is loadable into a data processing unit 510 and is configured to cause a processor 511 to carry out the method to control a vehicle system in accordance with the description of FIG. 1.

The data processing unit 510 may comprise the non-transitory computer-readable storage medium 512.

The data processing unit 510 may be comprised in a device 500.

The device 500 may be a personal computer, a server or a cloud server.

The device 500 may be part of an advanced driver assistance system and/or an automated driving system in a vehicle.

Turning back to FIG. 2, an example of the system of the present disclosure in a traffic scenario will now be described. The use of the present disclosure is in no way limited by the described traffic scenario example. In this example a deviating vehicle 230 is driving significantly slower than the speed limit and the average traffic speed. The system 200 comprises a first vehicle 221, a second vehicle 222 and a server 210. The server 210 comprises communication means 211 arranged to receive information from and transmit information to the first 221 and second vehicle 222. The first 221 and second vehicle 222 each comprise communication means 313, a perception system 311, positioning means 312, presentation means 314, and an advanced driver-assistance system 315, wherein the communication means 313 are arranged to receive information from and transmit information to the server 210. The server 210 is at a remote location. The system 200 is arranged to at regular intervals provide the server 210 with positional information of the first 221 and second vehicle 222. Communication between the server 210 and the first 221 and second vehicle 222 utilizes existing telecommunications infrastructure, such as 4G.

The traffic scenario schematically depicted in FIG. 2 shows the first vehicle 221 approaching the slowly moving deviating vehicle 230, and the second vehicle 222 approaching deviating vehicle 230. The distances between the deviating vehicle 230, the first vehicle 221 and the second vehicle 222 in FIG. 2 are not to scale. In the example traffic scenario the distance between the deviating vehicle 230 and the first vehicle 221 is 50 meters, and the distance between the deviating vehicle 230 and the second vehicle 222 is 500 meters.

The perception system 311 of the first vehicle 221 performs a measurement on the deviating vehicle 230 and register a speed difference fulfilling a predetermined criteria for deviating behaviour. The predetermined criteria in this example is based on the speed difference between the observed vehicle speed and the speed limit. Upon detecting a deviating behaviour a geographical position is obtained from the positioning means 312, thereby linking said observed deviating behaviour with a geographical location. The information relating to the detected deviating behaviour of the deviating vehicle 230 is transmitted from the first vehicle 221 to the server 210, wherein the transmitted information comprises the observed deviating behaviour, the time and the location. The server 210 receives the information relating to the detected deviating behaviour of the deviating vehicle 230. The server 210 classifies the detected deviating vehicle 230 based on the received information, assigning the deviating vehicle 230 as a slow vehicle. The server 210 determines that information relating to a slow vehicle in the received geographical location is relevant to the second vehicle 222 as the second vehicle 222 is determined to be located behind the slow deviating vehicle 230. The server 210 transmits a set of information relating to the deviating vehicle 230 to the second vehicle 222. The set of information relating to the deviating vehicle 230 comprises the assigned slow vehicle deviating vehicle classification. The second vehicle 222 receives the set of information and determines two predetermined actions based on the assigned deviating vehicle classification. The predetermined actions in this example are for the presentation means 314 to present a slow driver warning, and for the advanced driver-assistance system 315 to decrease the speed of the second vehicle 222.

What is claimed is:

1. A method comprising:
   detecting, by a first vehicle, a deviating vehicle having a deviating behaviour and/or a deviating vehicle property using a perception system of the first vehicle, wherein the perception system comprises at least one sensor device configured to monitor a surrounding environment of the first vehicle;
   assigning a deviating vehicle classification to the deviating vehicle based on the deviating behaviour and/or the deviating vehicle property;
   determining a second vehicle to receive information relating to the deviating vehicle and a time interval for the determined second vehicle, wherein the time interval is a future time interval;
   transmitting, to the determined second vehicle, a set of information relating to the deviating vehicle, said set of information comprising the determined time interval and at least one of the deviating vehicle classification or a predetermined instruction to be performed by the determined second vehicle, wherein the predetermined instruction is dependent on the deviating vehicle classification; and
   wherein the set of information is transferred to the determined second vehicle to perform a predetermined action by the determined second vehicle for a duration of the determined time interval, and wherein the predetermined action performed by the second vehicle is a driving operation.

2. The method according to claim 1, wherein determining the second vehicle to receive information is based on the deviating vehicle classification.

3. The method according to claim 1, wherein detecting the deviating vehicle comprises determining a timestamped location relating to the deviating vehicle, and wherein determining the second vehicle is based on the determined timestamped location.

4. The method according to claim 1, wherein the predetermined action comprises adjusting, at the determined second vehicle, a parameter of an advanced driver assistance system and/or an automated driving system based on to the received set of information and performing automated driving based on the adjusted parameter.

5. The method according to claim 1, wherein the predetermined action comprises adjusting a parameter of an advanced driver assistance system and/or an automated driving system based on to the received set of information for the duration of the determined time interval and performing automated driving based on the adjusted parameter.

6. The method according to claim 1, wherein the set of information comprises manoeuvre instructions to an advanced driver assistance system and/or an automated driving system comprising instructions to avoid takeover or to change to a slow lane and performing automated driving based on the manoeuvre instructions.

7. The method according to claim 1, wherein assigning the deviating vehicle classification is based on at least one detected deviating behaviour and/or a deviating vehicle property from at least two first vehicles detecting the deviating vehicle.

8. The method according to claim 1, wherein assigning the deviating vehicle classification may comprise selecting the deviating vehicle classification from a set of deviating vehicle classification types comprising slow vehicle, and/or fast vehicle, and/or erratic vehicle, and/or wide vehicle.

9. A computer program product comprising a non-transitory computer-readable storage medium having thereon a computer program comprising program instructions, the computer program being loadable into a data processing unit and configured to cause the data processing unit to perform a method comprising:
   detecting a deviating vehicle having a deviating behaviour and/or a deviating vehicle property using a perception system of a first vehicle, wherein the perception system comprises at least one sensor device configured to monitor a surrounding environment of the first vehicle;
   assigning a deviating vehicle classification to the deviating vehicle based on the deviating behaviour and/or the deviating vehicle property;
   determining a second vehicle to receive information relating to the deviating vehicle and a time interval for the determined second vehicle, wherein the time interval is a future time interval;
   transmitting, to the determined second vehicle, a set of information relating to the deviating vehicle, said set of information comprising the determined time interval and at least one of the deviating vehicle classification or a predetermined instruction to be performed by the determined second vehicle, wherein the predetermined instruction is dependent on the deviating vehicle classification; and
   wherein the set of information is transferred to the determined second vehicle to perform a predetermined action by the determined second vehicle for a duration of the determined time interval, and wherein the predetermined action performed by the second vehicle is a driving operation.

10. A system comprising,
    a server;
    a first vehicle comprising a perception system; and
    at least one second vehicle, wherein the perception system is configured to monitor a surrounding environment of the first vehicle, wherein the first vehicle is configured to:
        detect a deviating vehicle having a deviating behaviour and/or a deviating vehicle property using the perception system, and
        transmit information relating to the deviating vehicle to the server;
    the server is configured to:
        determine a second vehicle of the at least one second vehicle to receive information relating to the deviating vehicle and a time interval for the determined second vehicle, wherein the time interval is a future time interval, and
        transmit, to the determined second vehicle, a set of information relating to the deviating vehicle, said set of information comprising the determined time interval and at least one of a deviating vehicle classification or a predetermined instruction to be performed by the determined second vehicle, wherein the predetermined instruction is dependent on the deviating vehicle classification,
        wherein the set of information is transferred to the determined second vehicle to perform a predetermined action by the determined second vehicle for a duration of the determined time interval;
    the first vehicle or the server is configured to classify the deviating vehicle based on the detected deviating behaviour and/or deviating vehicle property;
    the determined second vehicle is configured to receive the set of information relating to the deviating vehicle; and the determined second vehicle comprises at least one of:

a display configured to display information, for a duration of the determined time interval, based on the deviating vehicle classification or based on the predetermined instruction;

an advanced driver-assistance system configured to adjust, for a duration of the determined time interval, a parameter based on the deviating vehicle classification or based on the predetermined instruction; or an autonomous driving system configured to adjust, for a duration of the determined time interval, a parameter based on the deviating vehicle classification or based on the predetermined instruction, wherein a driving operation of the determined second vehicle is controlled based on the set of information.

11. The system according to claim 10, wherein determining the at least one second vehicle is based on the classification of the deviating vehicle.

12. A vehicle comprising:

a perception system comprising at least one sensor device configured to monitor a surrounding environment of the vehicle;

a data processing unit configured to:

detect a deviating vehicle having a deviating behaviour and/or a deviating vehicle property using the perception system;

assign a deviating vehicle classification to the deviating vehicle based on the deviating behaviour and/or the deviating vehicle property;

determine a second vehicle to receive information relating to the deviating vehicle and a time interval for the determined second vehicle, wherein the time interval is a future time interval;

transmit, to the determined second vehicle a set of information relating to the deviating vehicle, said set of information comprising the determined time interval and at least one of the deviating vehicle classification or a predetermined instruction to be performed by the determined second vehicle, wherein the predetermined instruction is dependent on the deviating vehicle classification; and wherein the set of information is transferred to the second vehicle to perform a predetermined action by the second vehicle for a duration of the determined time interval, and wherein the predetermined action performed by the second vehicle is a driving operation.

* * * * *